US009527385B2

(12) United States Patent
Lee (10) Patent No.: US 9,527,385 B2
(45) Date of Patent: Dec. 27, 2016

(54) BATTERY POWER CUT OFF SYSTEM FOR VEHICLE AND METHOD THEREOF

(71) Applicants: Hyundai Motor Company, Seoul (KR); Kia Motors Corporation, Seoul (KR)

(72) Inventor: Young Jong Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 120 days.

(21) Appl. No.: 14/517,248

(22) Filed: Oct. 17, 2014

(65) Prior Publication Data
US 2015/0175002 A1 Jun. 25, 2015

(30) Foreign Application Priority Data
Dec. 24, 2013 (KR) .................. 10-2013-0162938

(51) Int. Cl.
*B60K 28/14* (2006.01)
*B60L 3/04* (2006.01)
(Continued)

(52) U.S. Cl.
CPC ............. *B60K 28/14* (2013.01); *B60L 3/0007* (2013.01); *B60L 3/0046* (2013.01); *B60L 3/0069* (2013.01); *B60L 3/04* (2013.01); *B60L 3/12* (2013.01); *B60L 11/1859* (2013.01); *B60R 21/0132* (2013.01); *B60R 21/0136* (2013.01); *B60L 2200/10* (2013.01); *B60L 2200/18* (2013.01); *B60L 2200/32* (2013.01); *B60L 2200/36* (2013.01); *B60L 2240/14* (2013.01); *B60L 2240/547* (2013.01); *B60L 2240/549* (2013.01); *B60L 2240/80* (2013.01); *B60L 2250/10* (2013.01); *B60L 2250/16* (2013.01);
(Continued)

(58) Field of Classification Search
None
See application file for complete search history.

(56) References Cited

U.S. PATENT DOCUMENTS

| 2008/0151454 | A1* | 6/2008 | Uhl | B60R 21/01 361/87 |
| 2012/0150393 | A1* | 6/2012 | Knight-Newbury | B60L 3/04 701/45 |
| 2013/0200690 | A1* | 8/2013 | Rini | H02J 7/0031 307/9.1 |

FOREIGN PATENT DOCUMENTS

| JP | 3310876 B2 | 8/2002 |
| JP | 2005094883 A | 4/2005 |

(Continued)

*Primary Examiner* — Rami Khatib
*Assistant Examiner* — Gerrad A Foster
(74) *Attorney, Agent, or Firm* — Mintz Levin Cohn Ferris Glovsky and Popeo, P.C.; Peter F. Corless (57) ABSTRACT

A battery power cut off system for a vehicle is provided that improves safety of the vehicle by separately detecting an overcurrent, an abnormal current, and a short current generated due to various causes while a vehicle is driven and cutting off power output from a battery. The system includes a collision sensing unit that detects an impact quantity due to a collision while the vehicle is driven and a battery sensor that detects an output current quantity of the battery. A controller analyzes the impact quantity and the output current quantity of the battery to determine whether a collision current, a short current, and an overcurrent are generated and perform a power cut off control. A switch is configured to cut off the battery power supplied to a large-capacity load element in response to a control signal of the controller.

13 Claims, 4 Drawing Sheets (51) Int. Cl.
    *B60R 21/0136* (2006.01)
    *B60R 21/0132* (2006.01)
    *B60L 3/00* (2006.01)
    *B60L 3/12* (2006.01)
    *B60L 11/18* (2006.01)
    *B60R 21/01* (2006.01)

(52) U.S. Cl.
    CPC . *B60R 2021/01252* (2013.01); *Y02T 10/7005* (2013.01); *Y02T 10/705* (2013.01)

(56) References Cited

FOREIGN PATENT DOCUMENTS

| | | |
|---|---|---|
| KR | 10-2010-0082507 | 7/2010 |
| KR | 10-1064275 B1 | 9/2011 |
| KR | 10-2012-0004129 | 1/2012 |
| KR | 10-1257923 B1 | 4/2013 |
| KR | 10-1997-0039200 | 7/2014 |

* cited by examiner

BATTERY POWER CUT OFF SYSTEM FOR VEHICLE AND METHOD THEREOF

CROSS-REFERENCE TO RELATED APPLICATION

This application claims priority to and the benefit of Korean Patent Application No. 10-2013-0162938 filed in the Korean Intellectual Property Office on Dec. 24, 2013, the entire contents of which are incorporated herein by reference.

BACKGROUND (a) Field of the Invention

The present invention relates to a battery power cut off system for a vehicle and a method thereof, and more particularly, to a battery power cut off system for a vehicle and a method thereof capable of improving safety of a vehicle by separately detecting a collision current, an overcurrent, and a short current, as an abnormal current, which are generated due to various causes while a vehicle is driven and cutting off power from a battery.

(b) Description of the Related Art

A vehicle according to the related art is not provided with a function of monitoring an overcurrent generated in a power system and cutting off power from a battery.

Therefore, an abnormal current may be generated due to a short of a cable or an exposure of a cable core wire which is caused by a collision between vehicles running in the same or opposite directions while a vehicle is driven, a short which is caused by an electrical leakage or a failure of loads due to unknown errors, a short which is caused by a user's carelessness, moisture introduced into a load and a controller module which is caused by aging of a vehicle, and the like. In this case, there is a risk of the occurrence of a fire in a vehicle.

Further, there is a serious risk that the generation of overcurrent in the vehicle may lead to a breakage of an electronic controller and a malfunction of a control system to cause secondary accidents, such as sudden unintended acceleration and the overcurrent is exposed to a driver or a vehicle mechanic to cause secondary accidents such as an electric shock.

The above information disclosed in this Background section is merely for enhancement of understanding of the background of the invention and therefore it may contain information that does not form the prior art that is already known in this country to a person of ordinary skill in the art.

SUMMARY

The present invention has been made in an effort to improve safety of a vehicle by cutting off power from a battery when a collision current, a short current, and an overcurrent are generated due to a failure of loads while a vehicle is driven, a short of a cable and an exposure of a core wire which is caused by a collision, moisture introduced into a controller module, and the like.

An exemplary embodiment of the present invention provides a battery power cut off system for a vehicle that may include: a collision sensing unit configured to detect an impact quantity due to a collision while the vehicle is driven; a battery sensor configured to detect an output current quantity of the battery; a controller configured to analyze the impact quantity provided from the collision sensing unit and the output current quantity of the battery provided from the battery sensor to determine whether a collision current, a short current, and an overcurrent are generated and perform a power cut off operation; and a switch configured to cut off the battery power supplied to a large-capacity load element in response to a control of the controller.

The collision sensing unit may include an air bag sensor configured to detect the impact quantity or a G sensor configured to detect instantaneous acceleration. The battery sensor may include a shunt resistor. In addition, the switch may include a latch relay. In particular, one portion of the switch may be connected to an emergency power load to supply the battery power to the emergency power load. Further, the battery power cut off system for a vehicle may further include a display unit configured to output the generation information of the collision current, the short current, and the overcurrent and power cut off information in a predetermined form in response to the control of the controller to guide (e.g., lead) an action of a driver.

The controller may be configured to determine that the collision current is generated due to a short of a high-pressure cable, an exposure of a cable core wire, and a breakage of a load apparatus caused by the accident occurrence determined by detecting the impact quantity of a reference quantity or greater and the output current quantity of the battery is continued for a first reference time period, exceeding a set first current quantity. The controller may be configured to determine that the overcurrent is generated when the output current quantity of the battery is continued for a second reference time period, exceeding a second current quantity when the accident occurrence is not determined.

The controller may be configured to determine that the short current is generated when the output current quantity of the battery is continued for the first reference time period, exceeding a set third current quantity when the accident occurrence is not determined. In response to determining that any of or at least one of the collision current, the overcurrent, and the short current is generated, the controller may be configured to turn off a switch using a driving unit to cut off the battery power supplied to a starter, an alternator, and a vehicle load which are large-capacity load elements.

Another exemplary embodiment of the present invention provides a battery power cut off method for a vehicle, that may include: detecting an impact quantity and an output current quantity of the battery applied to the vehicle; determining whether the generation of a collision current, a short current, and an overcurrent, as an abnormal current, is detected by analyzing the impact quantity and the output current quantity of the battery; and cutting off the battery power supplied to large-capacity loads when at least one of the collision current, the short current, and the overcurrent is detected.

The battery power cut off method for a vehicle may further include: leading a rapid action by outputting generation information of the abnormal current and power cut off information in a predetermined form when the cut off of the battery power supplied to the large capacity loads is performed in response to the detection of any one of the collision current, the short current, and the overcurrent. In addition, the battery power cut off method for a vehicle may further include: warning an emergency state of the vehicle by supplying the battery power to an emergency power load when the battery power supplied to large-capacity loads is cut off in response to the detection of any one of the collision current, the short current, and the overcurrent.

The battery power cut off method for a vehicle may further include: determining that the collision current is generated due to a short of a high-pressure cable and an exposure of a cable core wire, when the impact quantity is determined as an accident occurrence and the output current quantity of the battery is continued for a first reference time period, exceeding a set first current quantity. The battery power cut off method for a vehicle may further include: determining that the overcurrent is generated, when the impact quantity is not determined as the accident occurrence and the output current quantity of the battery is continued for a second reference time period, exceeding a set second current quantity. The battery power cut off method for a vehicle may further include: determining that the short current is generated, when the impact quantity is not determined as the accident occurrence and the output current quantity of the battery is continued for the first reference time period, exceeding a set third current quantity.

As set forth above, according to the exemplary embodiments of the present invention, it may be possible to previously prevent the occurrence of a fire by detecting the generation of a collision current, a short current, and an overcurrent while the vehicle is driven and cutting off the output power from the battery, thereby preventing damage of human life from occurring.

According to the exemplary embodiments of the present invention, it may be possible to previously prevent the occurrence of secondary accidents such as the breakage of the electronic controller disposed within the vehicle, the malfunction of the control system, and the electric shock of the driver and the vehicle mechanic by cutting off the output power from the battery when the generation of at least any one of the collision current, the short current, and the overcurrent is detected while the vehicle is driven. In addition, it may be possible to safely drive the vehicle by previously preventing the occurrence of a fire due to the overcurrent, the short current, and the collision current generated from the battery in the starter section which is the section not protected with the fuse in the vehicle.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the following detailed description, only certain exemplary embodiments of the present invention have been shown and described, simply by way of illustration. As those skilled in the art would realize, the described exemplary embodiments may be modified in various different ways, all without departing from the spirit or scope of the present invention. In order to clearly describe the present invention, portions that are not connected with the description will be omitted. Like reference numerals designate like elements throughout the specification. In addition, the size and thickness of each configuration shown in the drawings are arbitrarily shown for understanding and ease of description, but the present invention is not limited thereto.

Figure 1:
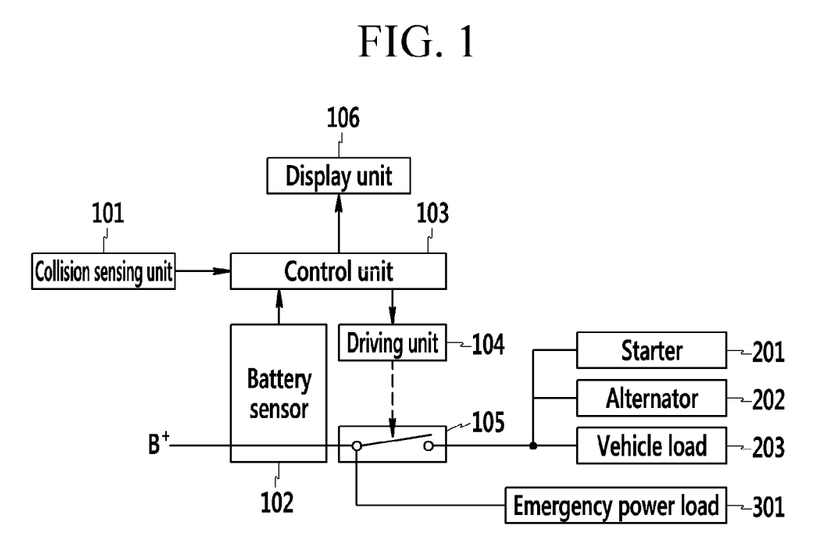
FIG. 1 is an exemplary diagram schematically illustrating a battery power cut off system for a vehicle according to an exemplary embodiment of the present invention.

FIG. 1 is an exemplary diagram schematically illustrating a battery power cut off system for a vehicle according to an exemplary embodiment of the present invention. Referring to FIG. 1, the battery power cut off system according to the exemplary embodiment of the present invention may include a collision sensing unit 101, a battery sensor 102, a controller 103, a driving unit 104, a switch 105, and a display unit 106.

The collision sensing unit 101 may be configured to detect an impact quantity due to a collision (e.g., between opposing vehicles or between vehicles running in the same direction) while the vehicle is driven and provide information to the controller 103. The collision sensing unit 101 may be applied to an air bag sensor configured to detect the impact quantity or a G sensor (e.g., an accelerometer) configured to detect substantially instantaneous acceleration. The battery sensor 102 may be connected to an output terminal (+) of the battery to detect a current quantity output from the battery and provide information thereon to the controller 103. The battery sensor 102 may be configured of a shunt resistor.

The controller 103 may be configured to determine that the collision of the vehicle occurs when the impact quantity of a set reference quantity or greater is detected by the collision sensing unit 101 and determine that the collision current is generated due to a short of a high-pressure cable, an exposure of a cable core wire, and a breakage of a load apparatus caused by external impact of the collision when an output current quantity of the battery detected by the battery sensor 102 is continued for a first reference time period of about 20 ms or greater at a set first current quantity of about 300 A or greater.

When determining the collision, the controller 103 may be configured to determine that the collision current is generated when the current quantity of about 300 A or greater is continued for about 20 ms or greater. The controller 103 may be configured to determine that when the output current quantity of the battery detected by the battery sensor 102 is continued for a second reference time period of about 30 seconds, exceeding a set second current quantity of about 500 A when the impact quantity of a set reference quantity or greater is not detected by the collision sensing unit 101, that is, when the collision is not determined, an overcurrent is generated.

The controller 103 may be configured to determine that when the output current quantity of the battery detected by the battery sensor 102 is continued for the first reference time period of about 20 ms or greater, exceeding a set third current quantity of about 1,000 A when the impact quantity of a set reference quantity or greater is not detected by the collision sensing unit 101, that is, when the collision is not determined, a substantially large current cable is shorted from a vehicle body and thus a short current is generated.

In response to determining that any one or at least one of the collision current, the overcurrent, and the short current is generated, the controller 103 may be configured to turn off the switch 105 using the driving unit 104 to cut off the battery power supplied to a starter 201, an alternator 202, and a vehicle load 203 which are large-capacity load elements. In response to determining that any one of the collision current, the overcurrent, and the short current is generated, the controller 103 may be configured to supply a voltage of the battery to an emergency power load when the controller 103 turns off the switch 105 using the driving unit 104 to warn drivers around a vehicle (e.g., in the vicinity of the vehicle) of an emergency state of the vehicle.

The driving unit 104 may be configured turn the switch 105 on and off in response to the control signal of the controller 103. The switch 105 may be turned on/off by the driving unit 104 to cut off the battery power supplied from a vehicle to the starter 201, the alternator 202, and the vehicle load 203 which are the large-capacity load elements. The switch 105 may be configured of a latch relay. The display unit 106 may be installed within a cluster in a predetermined form to be recognized by the driver and may be configured to output the generation information of the collision current, the short current, and the overcurrent and the output cut off information of the power from the battery in response to the control signal of the controller 103 by a predetermined scheme.

Figure 2:
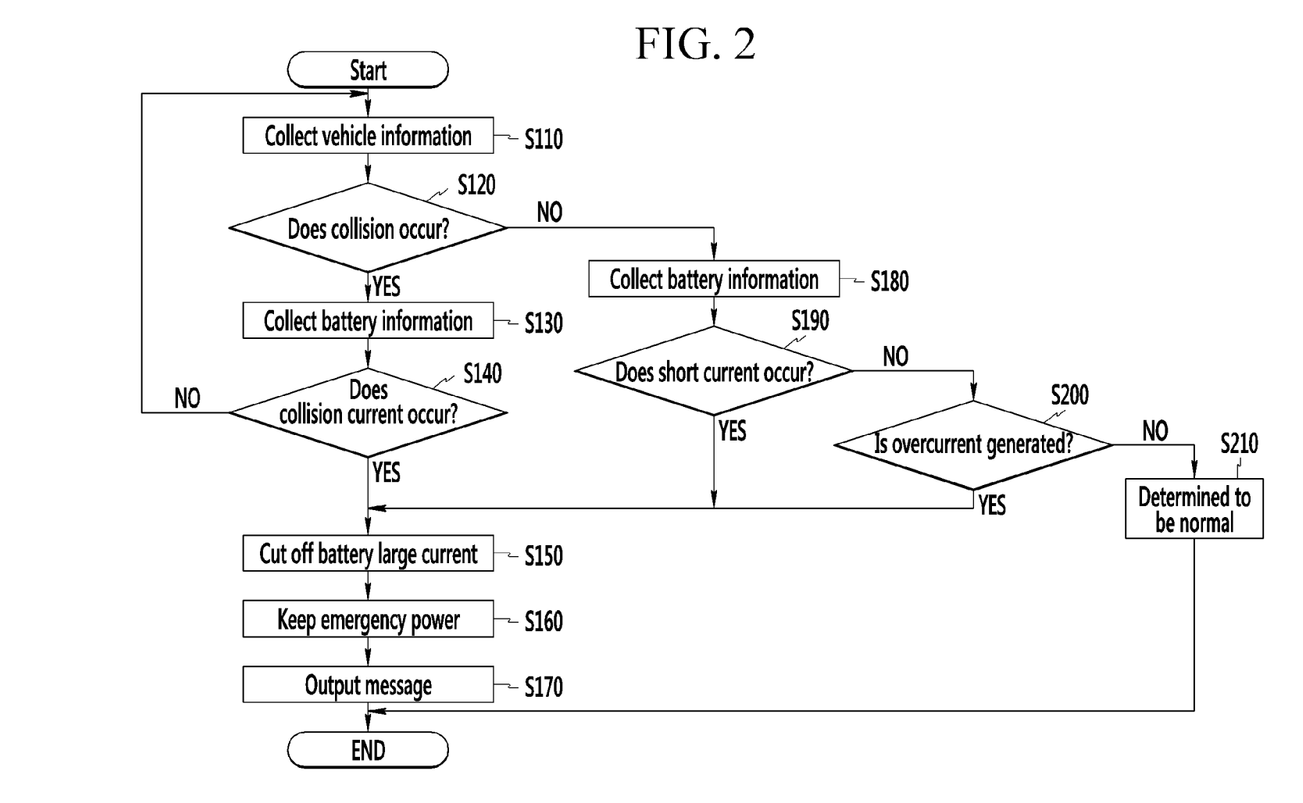
FIG. 2 is an exemplary diagram schematically illustrating a battery power cut off procedure for a vehicle according to an exemplary embodiment of the present invention.

An operation of the present invention including the foregoing functions will be described below and as shown in FIG. 2. The controller 103 may be configured to determine whether the occurrence of collision is detected by collecting the vehicle information (S110) and analyzing the information provided from the collision sensing unit 101 (S120) when the vehicle to which the present invention is applied is driven.

Figure 3:
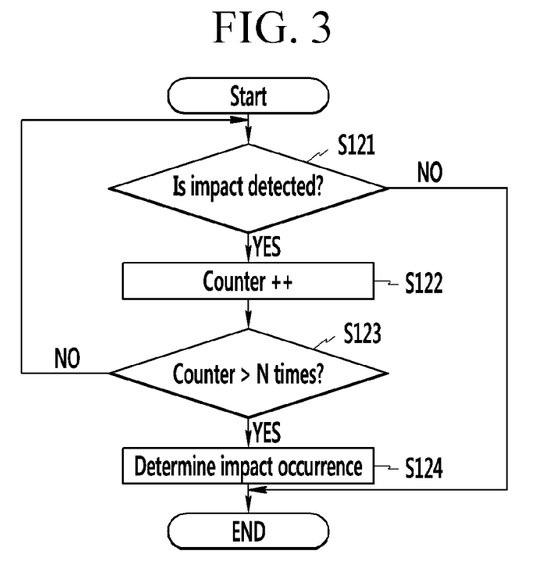
FIG. 3 is an exemplary flow chart for determining a collision in the battery power cut off system for a vehicle according to the exemplary embodiment of the present invention.

As may be appreciated from FIG. 3, the controller 103 may be configured to determine (e.g., count) a detection frequency of impact (S122) when the impact quantity of the set reference quantity or greater is detected by the collision sensing unit 101 (S121) and determine that the collision of the vehicle occurs (S124) when the detection frequency exceeds a set reference frequency within a predetermined time period, for example, about 20 ms (S123). In response to determining that the collision of the vehicle occurs in step S120, the controller 103 may be configured to collect the battery information provided from the battery sensor 102 (S130) to determine whether the collision current is generated (S140), as shown in FIG. 2.

The controller 103 may be configured to determine that the collision current is generated due to the short of the high-pressure cable, the exposure of the cable core wire, the breakage of the load apparatus, and the like caused by the external impact due to the collision when the output current quantity of the battery is continued for the first reference time period of about 20 ms or greater at the set first current quantity of about 300 A or greater in response to determining that the collision of the vehicle occurs in step S140.

When determining the collision, the controller 103 may be configured to determine that the collision current is generated when the current quantity of about 300 A or greater is continued for about 20 ms or greater. In response to determining that the collision current is generated, the controller 103 may be configured to turn off the switch 105 using the driving unit 104 to cut off the battery power supplied to the starter 201, the alternator 202, and the vehicle load 203 which are the large-capacity load elements (S150).

When the controller 103 turns off the switch 105 to cut off the power from a battery, the controller 103 may be configured to warn drivers around a vehicle of the emergency state of the vehicle by supplying the battery power to the emergency power load (S160). Further, the controller 103 may be configured to output the output cut off information of the power from the battery in response to the collision current generated due to the collision of the vehicle using the display unit 106 disposed within the cluster by a predetermined scheme to allow a driver to take an action (S170).

When the occurrence of the collision of the vehicle is not detected in step S120, the controller 103 may be configured to collect the battery information provided from the battery sensor 102 (S180) to determine whether the short current is generated (S190).

The controller 103 may be configured to determine that the short current is generated when the output current quantity of the battery is continued for the second reference time period of about 20 ms or greater at the set second current quantity of about 1,000 A or greater.

In response to determining that the short current is generated, the controller 103 may be configured to turn off the switch 105 using the driving unit 104 to cut off the battery power supplied to the starter 201, the alternator 202, and the vehicle load 203 which are the large-capacity load elements (S150). When the controller 103 turns off the switch 105 in response to the generation of the short current to cut off the output power from the battery, the controller 103 may be configured to warn drivers around a vehicle of the emergency state of the vehicle by supplying the battery power to the emergency power load (S160).

Further, the controller 103 may be configured to output the output cut off information of the power from the battery in response to the generation of the short current through the display unit 106 disposed within the cluster by a predetermined scheme to allow a driver to take an action (S170).

When the generation of the short current is not detected in step S190, the controller 103 may be configured to determine whether the overcurrent is generated (S200).

The controller 103 may be configured to determine that the overcurrent is generated when the output current quantity of the battery is continued for the third reference time period of about 30 seconds or greater at the set third current quantity of about 500 A or greater.

In response to determining that the overcurrent current is generated, the controller 103 may be configured to turn off the switch 105 using the driving unit 104 to cut off the battery power supplied to the starter 201, the alternator 202, and the vehicle load 203 which are the large-capacity load elements (S150).

When the controller 103 turns off the switch 105 based on the generation of the overcurrent to cut off the output power from the battery, the controller 103 may be configured to warn drivers around a vehicle of the emergency state of the vehicle by supplying the battery power to the emergency power load (S160). Further, the controller 103 may be configured to output the output cut off information of the power from the battery in response to the generation of the overcurrent through the display unit 106 disposed within the cluster by a predetermined scheme to allow a driver to take action (S170).

Figure 4:
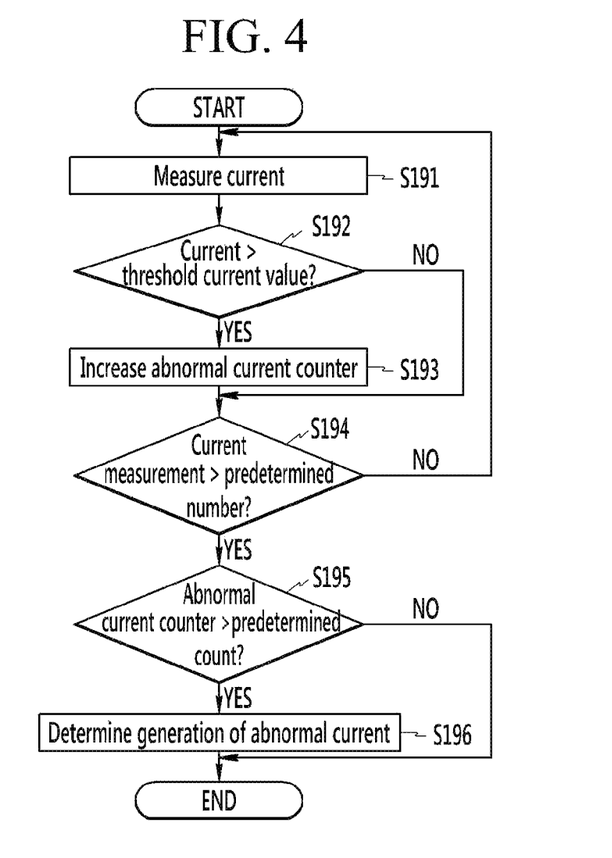
FIG. 4 is an exemplary flow chart for determining an abnormal current in the battery power cut off system for a vehicle according to the exemplary embodiment of the present invention.

FIG. 4 illustrates an exemplary embodiment of determining whether an abnormal current (i.e., the collision current in step S140, the short current in S190, and the overcurrent in S200) is generated.

The controller 103 may be configured to measure a current of the battery using the battery sensor 101. The controller measures the current of the battery at step S191, and determines whether the output current quantity of the battery exceeds a threshold current value at step S192.

When the output current quantity of the battery exceeds the threshold current value, the controller 103 increases a generation counter of the abnormal current at S193.

After the step S193 or when the output current quantity of the battery does not exceed the threshold current value at step S192, the controller determines whether the number of measurement of the output current is greater than a predetermined number at step S194.

When the measurement of the output current is not yet performed by more than the predetermined number at step S194, the controller 103 continues measurement of the output current by returning to the step S191.

When the measurement of the output current is performed by more than the predetermined number at step S194, the controller 103 determines whether the generation counter of the abnormal current is above a predetermined count at step S195.

When the generation counter of the abnormal current is above the predetermined count, the controller determines at step S196 that an abnormal current has occurred.

The above procedure S191 to S196 for determining whether an abnormal current has occurred may be applied for the determining steps S140, S190, and S200.

For the case of determining whether the collision current occurs in step S140, the threshold current value is set to the first current quantity of about 300 A, and the predetermined count may be set to a number corresponding to the first reference time period of about 20 ms. In this way, it may be determined whether the output current quantity of the battery at higher than the first current quantity of about 300 A is continued for more than the first reference time period of about 20 ms. In this case, the predetermined number of measurement of the output current may be set to be above the number corresponding to the first reference time period.

In the same way, for the case of determining whether the short current occurs in step S190, the threshold current value is set to the second current quantity of about 1,000 A, and the predetermined count may be set to a number corresponding to the second reference time period of about 20 ms. In this way, it may be determined whether the output current quantity of the battery at higher than the second current quantity of about 1,000 A is continued for more than the second reference time period of about 20 ms. In this case, the predetermined number of measurement of the output current may be set to be above the number corresponding to the second reference time period.

In the same way, for the case of determining whether the overcurrent occurs in step S200, the threshold current value is set to the third current quantity of about 500 A, and the predetermined count may be set to a number corresponding to the second reference time period of about 30 seconds. In this way, it may be determined whether the output current quantity of the battery at higher than the third current quantity of about 500 A is continued for more than the third reference time period of about 30 seconds. In this case, the predetermined number of measurement of the output current may be set to be above the number corresponding to the third reference time period.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the accompanying claims.

DESCRIPTION OF SYMBOLS

101: Collision sensing unit
102: Battery sensor
103: Control unit (e.g., controller)
104: Driving unit
105: Switch
106: Display unit

What is claimed is:

1. A battery power cut off system for a vehicle, comprising:
   a collision sensing unit configured to detect an impact quantity due to a collision while the vehicle is driven;
   a battery sensor configured to detect an output current quantity of the battery;
   a controller configured to analyze the impact quantity provided from the collision sensor and the output current quantity of the battery provided from the battery sensor to determine whether a collision current, a short current, and an overcurrent are generated and perform a power cut off control; and
   a switch configured to cut off the battery power supplied to a large-capacity load element in response to a control signal from the controller,
   wherein the controller is configured to:
      determine that the collision current is generated due to a short of a high-pressure cable, an exposure of a cable core wire, and a breakage of a load apparatus caused by the collision occurrence determined by detecting the impact quantity of a reference or greater and the output current quantity of the battery is continued for a first reference time period, exceeding a set first current quantity;

determine that the overcurrent is generated when the output current quantity of the battery is continued for a second reference time period, exceeding a set second current quantity in response to determining no collision; and determine that the short current is generated when the output current quantity of the battery is continued for a third reference time period, exceeding a set third current quantity in response to determining no collision, wherein the set third current quantity is greater than the set second current quantity and the second current quantity is greater than the set first current quantity, and wherein the third reference time period is less than the second reference time period and the second reference time period is greater than the first reference time period.

2. The battery power cut off system for a vehicle of claim 1, wherein:

the collision sensing unit is configured of an air bag sensor configured to detect the impact quantity or a G sensor configured to detect instantaneous acceleration.

3. The battery power cut off system for a vehicle of claim 1, wherein:

the battery sensor is comprised of a shunt resistor.

4. The battery power cut off system for a vehicle of claim 1, wherein:

the switch is comprised of a latch relay.

5. The battery power cut off system for a vehicle of claim 1, wherein:

one portion of the switch is connected to an emergency power load to supply the battery power to the emergency power load.

6. The battery power cut off system for a vehicle of claim 1, further comprising:

a display unit configured to output the generation information of the collision current, the short current, and the overcurrent and power cut off information in a predetermined form in response to a control signal of the controller to guide an action of a driver.

7. The battery power cut off system for a vehicle of claim 1, wherein: the controller is configured to turn off a switch using a driving unit to cut off the battery power supplied to a starter, an alternator, and a vehicle load which are large-capacity load elements in response to determining that at least one of the collision current, the overcurrent, and the short current is generated.

8. A battery power cut off method for a vehicle, comprising:

detecting, by a controller, an impact quantity and an output current quantity of the battery applied to the vehicle;

determining, by the controller, whether the generation of a collision current, a short current, and an overcurrent as an abnormal current is detected by analyzing the impact quantity and the output current quantity of the battery;

cutting off, by the controller, the battery power supplied to large-capacity loads when at least one of the collision current, the short current, and the overcurrent is detected;

determining, by the controller, that the collision current is generated due to a short of a high-pressure cable and an exposure of a cable core wire, when the impact quantity is determined as an accident occurrence and the output current quantity of the battery is continued for a first reference time period, exceeding a set first current quantity;

determining, by the controller, that the overcurrent is generated, when the impact quantity is not determined as the accident occurrence and the output current quantity of the battery is continued for a second reference time period, exceeding a set second current quantity; and determining, by the controller, that the short current is generated, when the impact quantity is not determined as the accident occurrence and the output current quantity of the battery is continued for a third reference time period, exceeding a set third current quantity, wherein the set third current quantity is greater than the set second current quantity and the second current quantity is greater than the set first current quantity, and wherein the third reference time period is less than the second reference time period and the second reference time period is greater than the first reference time period.

9. The battery power cut off method for a vehicle of claim 8, further comprising:

guiding, by the controller, an action by outputting generation information of the abnormal current and power cut off information in a predetermined form when the cut off of the battery power supplied to the large capacity loads is performed in response to the detection of any one of the collision current, the short current, and the overcurrent.

10. The battery power cut off method for a vehicle of claim 8, further comprising:

warning, by the controller, an emergency state of the vehicle by supplying the battery power to an emergency power load when the battery power supplied to large-capacity loads is cut off in response to the detection of any one of the collision current, the short current, and the overcurrent.

11. A non-transitory computer readable medium containing program instructions executed by a controller, the computer readable medium comprising:

program instructions that detect an impact quantity and an output current quantity of the battery applied to the vehicle;

program instructions that determine whether the generation of a collision current, a short current, and an overcurrent as an abnormal current is detected by analyzing the impact quantity and the output current quantity of the battery;

program instructions that cut off the battery power supplied to large-capacity loads when at least one of the collision current, the short current, and the overcurrent is detected;

program instructions that determine that the collision current is generated due to a short of a high-pressure cable and an exposure of a cable core wire, when the impact quantity is determined as an accident occurrence and the output current quantity of the battery is continued for a first reference time period, exceeding a set first current quantity;

program instructions that determine that the overcurrent is generated, when the impact quantity is not determined as the accident occurrence and the output current quantity of the battery is continued for a second reference time period, exceeding a set second current quantity; and program instructions that determine that the short current is generated, when the impact quantity is not determined as the accident occurrence and the output current quantity of the battery is continued for a third reference time period, exceeding a set third current quantity, wherein the set third current quantity is greater than the set second current quantity and the second current quantity is greater than the set first current quantity, and wherein the third reference time period is less than the second reference time period and the second reference time period is greater than the first reference time period.

12. The non-transitory computer readable medium of claim 11, further comprising:

program instructions that guide an action by outputting generation information of the abnormal current and power cut off information in a predetermined form when the cut off of the battery power supplied to the large capacity loads is performed in response to the detection of any one of the collision current, the short current, and the overcurrent.

13. The non-transitory computer readable medium of claim 11, further comprising:

program instructions that warn an emergency state of the vehicle by supplying the battery power to an emergency power load when the battery power supplied to large-capacity loads is cut off in response to the detection of any one of the collision current, the short current, and the overcurrent.

* * * * *